(12) United States Patent
Chikara (10) Patent No.: US 12,138,789 B2
(45) Date of Patent: Nov. 12, 2024

(54) JOINT MECHANISM AND ROBOT ARM MECHANISM

(71) Applicant: FANUC CORPORATION, Yamanashi (JP)

(72) Inventor: Shinya Chikara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/022,688

(22) PCT Filed: Sep. 10, 2021

(86) PCT No.: PCT/JP2021/033300
§ 371 (c)(1),
(2) Date: Feb. 22, 2023

(87) PCT Pub. No.: WO2022/059614
PCT Pub. Date: Mar. 24, 2022

(65) Prior Publication Data
US 2023/0302630 A1    Sep. 28, 2023

(30) Foreign Application Priority Data

Sep. 15, 2020 (JP) .................................. 2020-154724

(51) Int. Cl.
*B25J 19/00* (2006.01)
*B25J 9/10* (2006.01)

(52) U.S. Cl.
CPC .............. *B25J 9/10* (2013.01); *B25J 19/0012* (2013.01)

(58) Field of Classification Search
CPC ......... B25J 9/10; B25J 19/008; B25J 19/0016
See application file for complete search history.

(56) References Cited

U.S. PATENT DOCUMENTS

| 3,643,291 A | * | 2/1972 | Clark | .................... E05F 1/1276 16/289 |
| 4,742,598 A | * | 5/1988 | Bruneau | .............. E05F 1/1066 16/322 |

(Continued)

FOREIGN PATENT DOCUMENTS

| JP | 55-106787 | * | 8/1980 |
| JP | S62-056299 A | | 3/1987 |

(Continued)

OTHER PUBLICATIONS

International Search Report issued in PCT/JP2021/033300 mailed on Nov. 22, 2021 with English Translation (5 bages).

(Continued)

*Primary Examiner* — William C Joyce
(74) *Attorney, Agent, or Firm* — Nakanishi IP Associates, LLC (57) ABSTRACT

A joint mechanism includes a balancer mechanism for generating an auxiliary torque that counteracts a load torque around the rotational center line of the arm applied to the support member by the weight of the arm. The balancer mechanism includes: a balancer body including a casing rotatably supported with respect to a base, a piston rod inserted into the casing, and a traction means for pulling the piston rod; and a transmission member for converting a traction force generated by the traction means into the auxiliary torque and transmitting the auxiliary torque to the arm. The transmission member is pivotally supported with respect to the base as a separate body from the support member, one end of the transmission member is engaged with an end of the piston rod, and the other end of the transmission member is engaged with the arm.

7 Claims, 7 Drawing Sheets

(56) References Cited

U.S. PATENT DOCUMENTS

| | | | |
|---|---|---|---|
| 4,801,237 A | | 1/1989 | Yamamoto |
| 4,803,895 A | * | 2/1989 | Nishizawa ............ B25J 19/0016 74/592 |
| 5,138,904 A | | 8/1992 | Lande et al. |
| 5,956,465 A | | 9/1999 | Takagi et al. |
| 6,543,914 B2 | * | 4/2003 | Sander .................... F16M 11/08 362/419 |
| 8,978,507 B2 | * | 3/2015 | Long .................... B25J 19/0016 901/15 |
| 2012/0186380 A1 | | 7/2012 | Yamada et al. |

FOREIGN PATENT DOCUMENTS

| | | |
|---|---|---|
| JP | S63-191586 A | 8/1988 |
| JP | 2543539 B2 | 10/1996 |
| JP | H10-015875 A | 1/1998 |
| JP | H10-027022 A | 1/1998 |
| WO | 2011/007793 A1 | 1/2011 |

OTHER PUBLICATIONS

Written Opinion of the International Searching Authority issued in PCT/JP2021/033300 mailed on Nov. 22, 2021 with English Translation (7 pages).

* cited by examiner

JOINT MECHANISM AND ROBOT ARM MECHANISM

TECHNICAL FIELD

This disclosure relates generally to a joint mechanism and a robot arm mechanism.

BACKGROUND

As a multi-joint type industrial robot, there is known an industrial robot provided with a balancer mechanism for generating a force in a direction opposite to the direction of a load due to gravity to assist power of a mechanism for driving an arm (for example, Patent Literature 1). For example, the balancer mechanism is composed of a casing tiltably coupled to a base, and a piston rod slidably provided in the casing. The piston rod is rotatably connected to the arm at its end and is pulled toward the inside of the casing. By the piston rod being pulled out of the casing as the arm rotates, the arm is pulled by the piston rod in a direction opposite to the direction of the load due to gravity, thereby assisting the power of the mechanism for driving the arm.

CITATION LIST

Patent Literature

Patent Literature 1: Japanese Patent No. 2543539

BRIEF DESCRIPTION OF THE DRAWINGS

FIG. 5 is a side view showing a tilted posture of the arm of the joint mechanism in

FIG. 1.

DETAILED DESCRIPTION

A joint mechanism according to one aspect of the present disclosure includes a base, an arm, a support member for rotatably supporting the arm with respect to the base, and a balancer mechanism for generating an auxiliary torque that counteracts a load torque applied around the rotational center line of the arm by the weight of the arm. The balancer mechanism includes a balancer body including a casing rotatably supported with respect to the base, a piston rod inserted into the casing, and a traction means for pulling the piston rod, and a transmission member for converting a traction force generated by the traction means into the auxiliary torque and transmitting the auxiliary torque to the arm. The transmission member is pivotally supported with respect to the base via a shaft, as a separate body from the support member. The transmission member is engaged with an end of the piston rod at a first position separated by a first distance from the center line of the shaft and is engaged with the arm at a second position separated by a second distance from the center line of the shaft.

Hereinafter, a joint mechanism according to the present embodiment will be described with reference to the drawings. In the following description, constituent elements having substantially the same function and configuration are denoted by the same reference numeral, and repetitive descriptions will be given only where necessary.

The joint mechanism according to the present embodiment can be used alone or as a joint mechanism of a robot arm mechanism or the like.

As shown in FIGS. 1 to 4, a joint mechanism 1 includes a base 2, a rod-shaped arm 3 supported rotatably with respect to the base 2, an arm drive mechanism 4 for driving the arm 3, and a balancer mechanism 5 which functions as a balancer for reducing a load on a bearing or the like supporting the arm 3.

The base 2 has a rectangular bottom plate 21 and a pair of side plates 23 and 25 provided on both edges of the bottom plate 21 so as to be parallel to each other. In the following description, an axis parallel to the thickness direction of the bottom plate 21 is referred to as the Z-axis, an axis parallel to the thickness direction of the side plates 23 and 25 (the direction in which the pair of side plates 23 and 25 are separated from each other) is referred to as the X-axis, and an axis orthogonal to the X-axis and the Z-axis is referred to as the Y-axis, as appropriate.

The arm drive mechanism 4 is supported by one side plate 23 of the pair of side plates 23 and 25. The arm drive mechanism 4 has a motor 41 that generates power for rotating the arm 3, and a reduction gear 43 that reduces the rotation of the motor 41. The arm drive mechanism 4 is configured such that the center line RA1 (rotational axis RA1) of an output shaft 45 of the reduction gear 43 is parallel to the X-axis. The arm 3 is attached to a case of the reduction gear 43 via a bearing 47, and is fastened to the output shaft 45 of the reduction gear 43 by a fixing tool such as a bolt. This allows the arm 3 to rotate around the rotational axis RA1 parallel to the X-axis as the output shaft 45 of the reduction gear 43 rotates.

The balancer mechanism 5 has a balancer body 50 and a transmission member 55.

The balancer body 50 has a casing 51, a piston rod 53 inserted into the casing 51, and a traction means 52 for pulling the piston rod 53 into the casing 51. Typically, a compression coil spring 52 is housed inside the casing 51 in a compressed state as the traction means 52. One end of the piston rod 53 is connected to the compression coil spring 52. This allows the piston rod 53 pulled out from the inside of the casing 51 to be pulled toward the inside of the casing 51 by the compression coil spring 52. The casing 51 is provided rotatably around the X-axis with respect to the base 2. Typically, a shaft 54 is fixed between the pair of side plates 23 and 25 such that the center line RA3 (rotational axis RA3) is parallel to the X-axis. The casing 51 is attached to the shaft 54 via a bearing or the like. This allows the casing 51 to be rotated around the rotational axis RA3 parallel to the X-axis.

The transmission member 55 is configured as an L-shaped plate. One end of the transmission member 55 is connected to the other end of the piston rod 53 rotatably around an axis RA4 parallel to the X-axis. The other end of the transmission member 55 is fixed to a position on the distal end side of the arm 3 via a fixing member 56. The transmission member 55 is provided rotatably around the X-axis with respect to the base 2. Typically, a shaft 57 is fixed to the other side plate 25 of the pair of side plates 23 and 25 such that the center line RA2 coincides with the rotational axis RA1 of the arm 3. The transmission member 55 is attached to the shaft 57 via a bearing or the like. This allows the transmission member 55 to be rotated around the center line RA2 (rotational axis RA2) which coincides with the rotational axis of the arm 3. The output shaft 45 supporting the transmission member 55 is a separate body from the shaft 57 and bearing 47 supporting the arm 3, and is separated from the shaft 57 and bearing 47. As described above, the arm 3 and the transmission member 55 are fixed to each other at their ends, but it is one feature that the support structure of the transmission member 55 with respect to the base 2 is a separate body from the support structure of the arm 3 with respect to the base 2.

Figure 1:
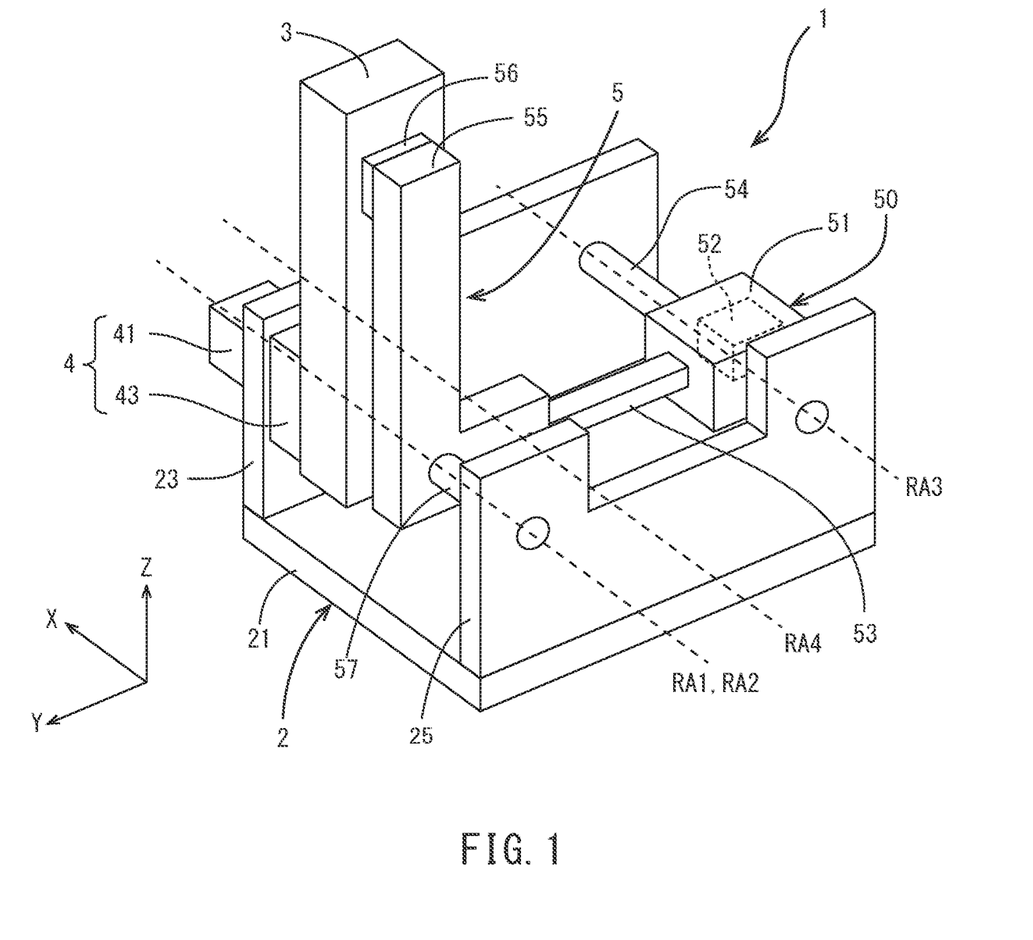
FIG. 1 is a perspective view of a joint mechanism according to an embodiment.
Figure 2:
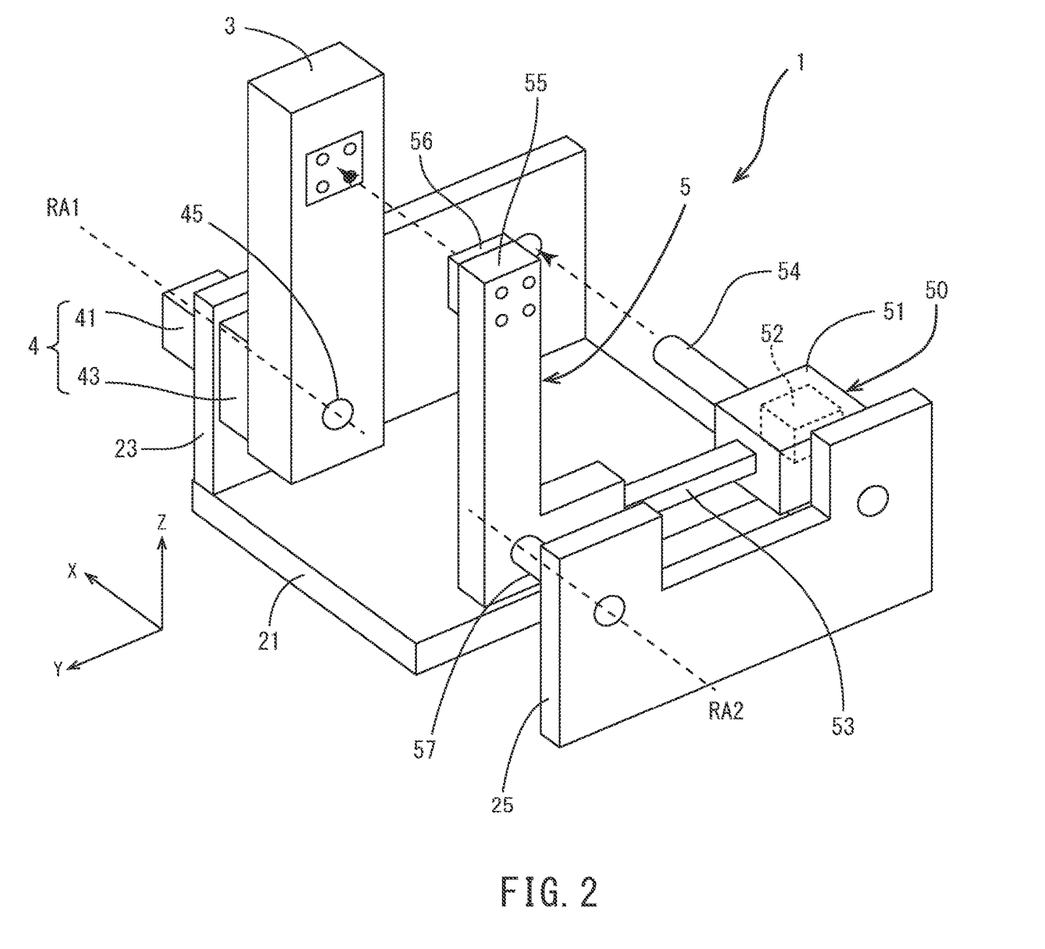
FIG. 2 is an exploded perspective view of the joint mechanism in FIG. 1.
Figure 3:
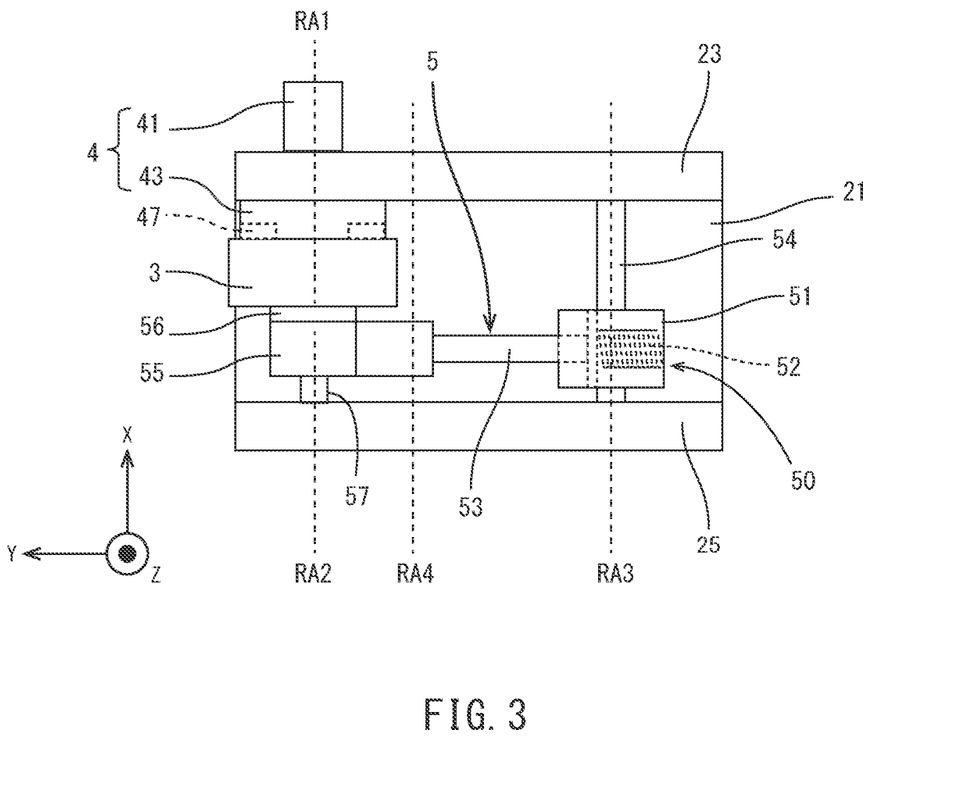
FIG. 3 is a plan view of the joint mechanism in FIG. 1.
Figure 4:
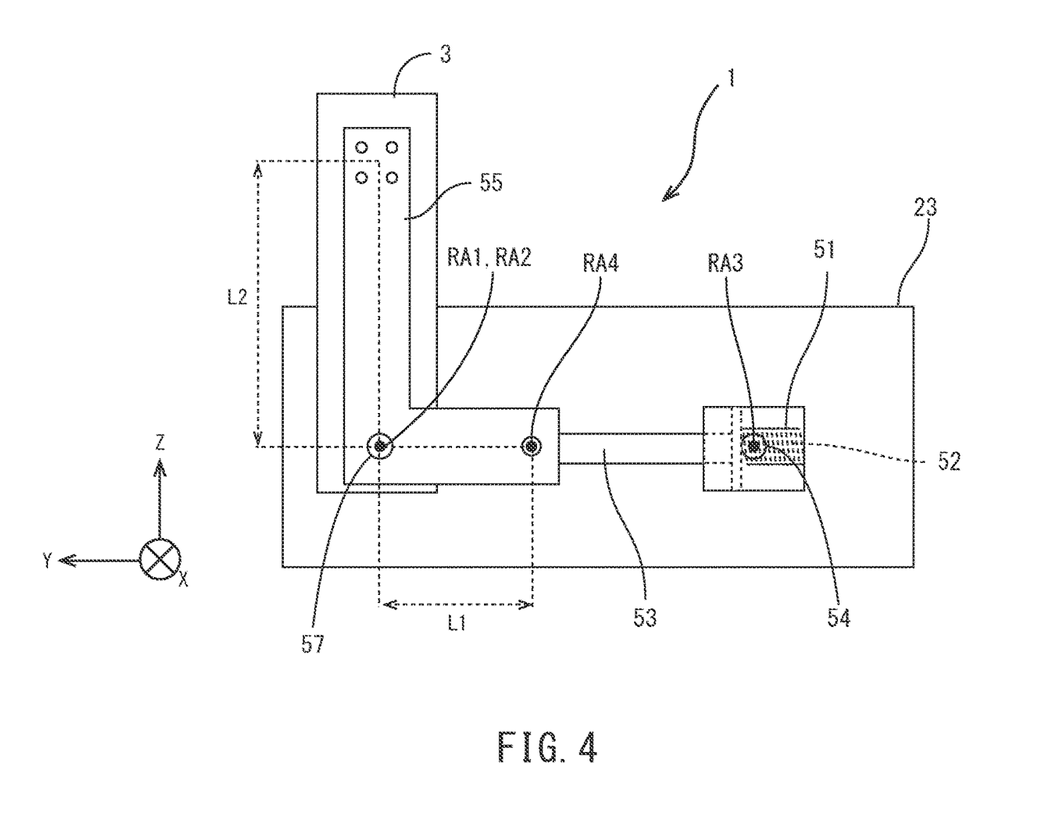
FIG. 4 is a side view showing a reference posture of an arm of the joint mechanism in FIG. 1.
Figure 5:
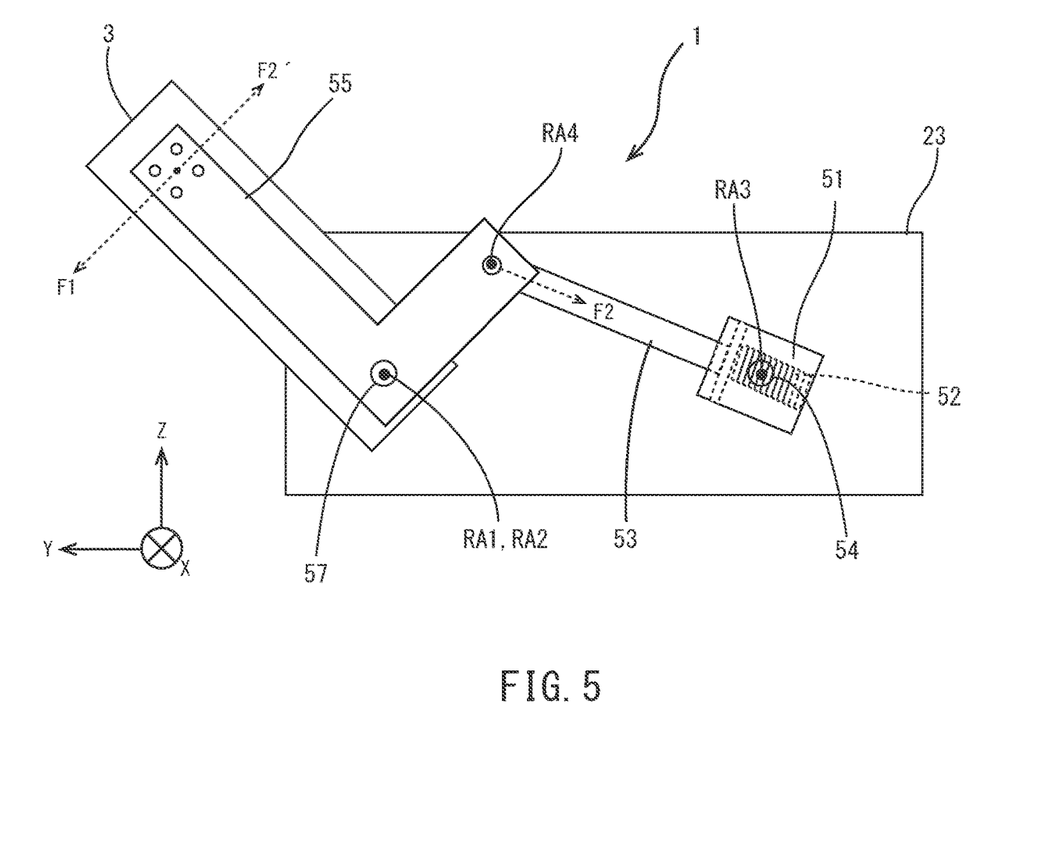

As shown in FIG. 4, the rotation angle of the arm 3 when the center line of the arm 3 is parallel to the Z-axis (vertical axis) is assumed to be 0 degrees. This posture is assumed to be the reference posture of the arm 3. When the arm 3 is in the reference posture, a load torque F1 around the rotational axis RA1 due to the weight of the arm 3 is not generated for the bearing 47 supporting the arm 3. On the other hand, as shown in FIG. 5, when the arm 3 is tilted (rotated) from the reference posture, the load torque F1 around the rotational axis RA1 due to the weight of the arm 3 is generated for the bearing 47 supporting the arm 3. At this time, the balancer mechanism 5 functions as follows. That is, the transmission member 55 is rotated around the rotational axis RA2 following the rotation of the arm 3. As the transmission member 55 rotates, the distance and the angle around the X-axis between the rotational axis RA4 at the point where the transmission member 55 is connected to the piston rod 53 and the rotational axis RA3 of the casing 51 change. The casing 51 is rotated around the rotational axis RA3 so that the piston rod 53 is disposed along a straight line passing through the rotational axis RA3 and the rotational axis RA4. The piston rod 53 is pulled out of the casing 51 against the traction force of the compression coil spring 52. The length of the piston rod 53 pulled out of the casing 51 corresponds to the difference between the distance from the rotational axis RA3 to the rotational axis RA4 when the arm 3 is tilted and that when the arm 3 is in the reference posture. The piston rod 53 pulled out of the casing 51 is pulled into the casing 51 by the compression coil spring 52. The traction force F2 generated by the compression coil spring 52 is converted into an auxiliary torque F2' around the rotational axis RA2 (rotational axis RA1) by the transmission member 55 and is transmitted to the arm 3. The auxiliary torque F2' acts in the opposite direction to the load torque F1 around the rotational axis RA1 due to the weight of the arm 3. Therefore, a moment corresponding to the combined torque (F1-F2') of the load torque F1 and the auxiliary torque F2' is applied to the bearing 47 supporting the arm 3. In contrast, the aforementioned auxiliary torque F2' does not occur in a joint mechanism without the balancer mechanism 5. Therefore, a moment corresponding to the load torque F1 is applied to the bearing 47 supporting the arm 3. In other words, the joint mechanism 1 according to the present embodiment can reduce the load on the bearing 47 supporting the arm 3 by the moment corresponding to the auxiliary torque F2'.

The balancer mechanism 5 is not directly connected to the arm 3, but is connected to the distal end side of the arm 3 via the transmission member 55, whereby the following effects can be achieved. That is, when the piston rod 53 of the balancer mechanism 5 is directly connected to the arm 3, the traction force generated by the compression coil spring 52 also acts as a load on the bearing 47 supporting the arm 3. Therefore, the bearing 47 supporting the arm 3 must receive two loads, the load due to the traction force generated by the compression coil spring 52 and the load due to the weight of the arm 3. In the joint mechanism 1 according to the present embodiment, the traction force generated by the compression coil spring 52 is transmitted to the distal end side of the arm 3 via the transmission member 55. In addition, the shaft 57 supporting the transmission member 55 is a separate body from the bearing 47 supporting the arm 3. Thus, the traction force generated by the compression coil spring 52 directly acts as a load on the shaft 57 supporting the transmission member 55, but does not directly act as a load on the bearing 47 supporting the arm 3.

In the joint mechanism 1 according to the present embodiment described above, the balancer mechanism 5 allows only the moment due to the combined torque (F1-F2') described above to be applied to the bearing 47 supporting the arm 3, so that the load on the bearing 47 supporting the arm 3 can be reduced. This can reduce the risk of failure and extend the life of the bearing 47 supporting the arm 3 and the reduction gear 43 (motor 41) for driving the arm 3. In addition, since the load on the bearing 47 supporting the arm 3 is small, the bearing 47 can be reduced in size. This contributes to lower component costs. Further, by increasing the auxiliary torque F2', the static torque generated by the motor 41 can be reduced. This contributes to reduction in power consumption of the joint mechanism 1 and the robot including the joint mechanism 1.

In the joint mechanism 1 according to the present embodiment, the transmission member 55 is separated from the arm 3 also in appearance. However, since the rotational axis RA2 of the transmission member 55 coincides with the rotational axis RA1 of the arm 3, the transmission member 55 can be easily housed inside the arm 3. Housing the transmission member 55 inside the arm 3 not only realize reduction in size of the joint mechanism 1, but also achieve the effect of simplifying the appearance and improving the aesthetics and the effect of avoiding the situation where a wire body such as a cable wired outside of the joint mechanism 1 enters complicatedly between the arm 3 and the transmission member 55 and is disconnected.

The joint mechanism 1 according to the present embodiment has a coil spring type balancer body 50 employing a compression coil spring 52 as the traction means 52. The configuration of the balancer body 50 is not limited to this as long as it can generate a traction force for pulling the piston rod 53 back into the casing 51. For example, the balancer body 50 can employ a known system such as a gas spring system in which a compressible gas enclosed in the casing 51 is compressed when the piston rod 53 is pulled out of the casing 51, and the repulsive force pulls the piston rod 53 back into the casing 51, a system using an air cylinder, or a system using hydraulic pressure.

The shape of the transmission member 55 is not limited to the one in the present embodiment. The transmission member 55 may be, for example, a plate having a dogleg shape or an arch shape as long as it can be fixed at a position on the distal end side of the arm 3, can be rotatably supported coaxially with the rotational axis RA1 of the arm 3, and can be rotatably connected to the piston rod 53.

When the distance from the center line of the shaft 54 to the position where the transmission member 55 is connected to the piston rod 53 is a first distance L1 and the distance from the center line of the shaft 54 to the position where the transmission member 55 is fixed to the arm 3 is a second distance L2, the transmission member 55 is typically configured such that the second distance L2 is longer than the first distance L1. However, this does not preclude the second distance L2 from being equal to or less than the first distance L1, and these parameters L1 and L2 of the transmission member 55 can be determined from the viewpoint of the magnitude of the traction force, the magnitude of the auxiliary torque required, and the installation space of the balancer mechanism 5.

The support structure of the arm 3 with respect to the base 2 is not limited to the one in the present embodiment. For example, the arm 3 may be connected to the base 2 via the bearing 47, or the arm 3 may be directly connected to the output shaft 45 of the reduction gear 43. In this case, the balancer mechanism 5 functions to reduce the load applied to the output shaft 45 of the reduction gear 43 supporting the arm 3.

The support structure of the transmission member 55 with respect to the base 2 is not limited to the one in the present embodiment. The support structure of the transmission member 55 only has to be a separate body from the support structure of the arm 3. For example, the shaft 57 to which the transmission member 55 is fixed may be rotatably attached to the base 2. Alternatively, the transmission member 55 may be supported rotatably around the X-axis by another member whose position is fixed with respect to the base 2. Similarly to the support structure of the transmission member 55 with respect to the base 2, the support structure of the casing 51 with respect to the base 2 is not limited to the one in the present embodiment.

In the joint mechanism 1 according to the present embodiment, one end of the transmission member 55 is rotatably connected to the piston rod 53 of the balancer mechanism 5, and the other end of the transmission member 55 is fixed at a position on the distal end side of the arm 3. This allows the balancer mechanism 5 to function by tilting the arm 3 from the reference posture, even if the tilt angle is small. However, when the load torque around the rotational axis RA1 due to the weight of the arm 3 is small, such as when the arm 3 is slightly tilted from the reference posture, the balancer mechanism 5 may not necessarily need to function. In such a case, the balancer mechanism 5 may be configured to function when the arm 3 is rotated from the reference posture to a predetermined angle or more. Hereinafter, a configuration for limiting the range of the angle that causes the balancer mechanism 5 to function will be described in a first modification and a second modification. The first modification shows a configuration in which the engagement structure between the other end of the transmission member 55 and the arm 3 is changed, and the second modification shows a configuration in which the engagement structure between the piston rod 53 and one end of the transmission member 55 is changed.

First Modification

Figure 6:
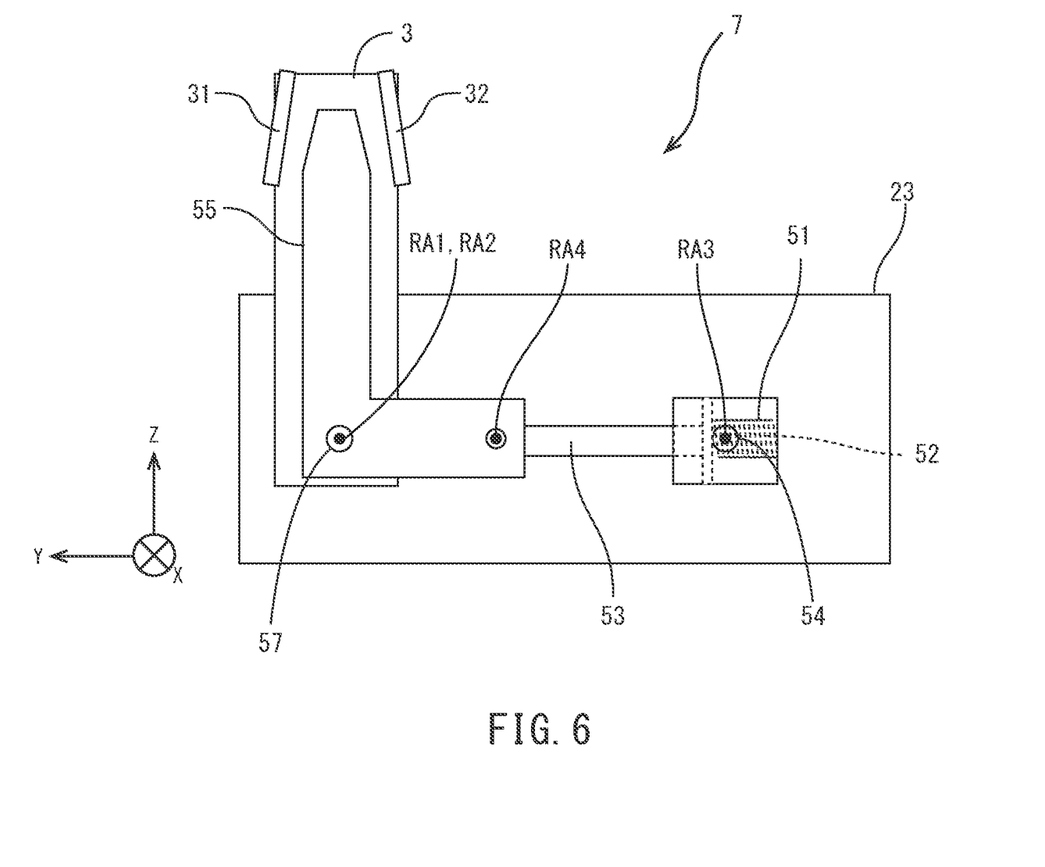
FIG. 6 is a side view showing a reference posture of an arm of a joint mechanism according to a first modification of the embodiment.

As shown in FIG. 6, in a joint mechanism 7 according to the first modification, the other end of the transmission member 55 is a free end. The arm 3 is provided with a projection 31, 33 which engages with the transmission member 55 when the arm 3 is tilted from the reference posture to a predetermined angle. Since the other end of the transmission member 55 is not fixed at the position on the distal end side of the arm 3, the rotational axis RA2 of the transmission member 55 does not need to coincide with the rotational axis RA1 of the arm 3. The joint mechanism 7 according to the first modification allows the balancer mechanism 5 to function when the arm 3 is titled by a predetermined angle or more from the reference posture, which is a state where an end of the transmission member 55 is in contact with the projection 31, 33 provided on the arm 3. On the other hand, the balancer mechanism 5 does not function until the arm 3 is tilted from the reference posture to the predetermined angle, i.e., until the end of the transmission member 55 comes into contact with the projection 31, 33 provided on the arm 3. Since the range of the rotation angle that causes the balancer mechanism 5 to function can be narrowed, the stroke length required for the piston rod 53 can be shortened, and the balancer mechanism 5 can be reduced in size.

Second Modification

Figure 7:
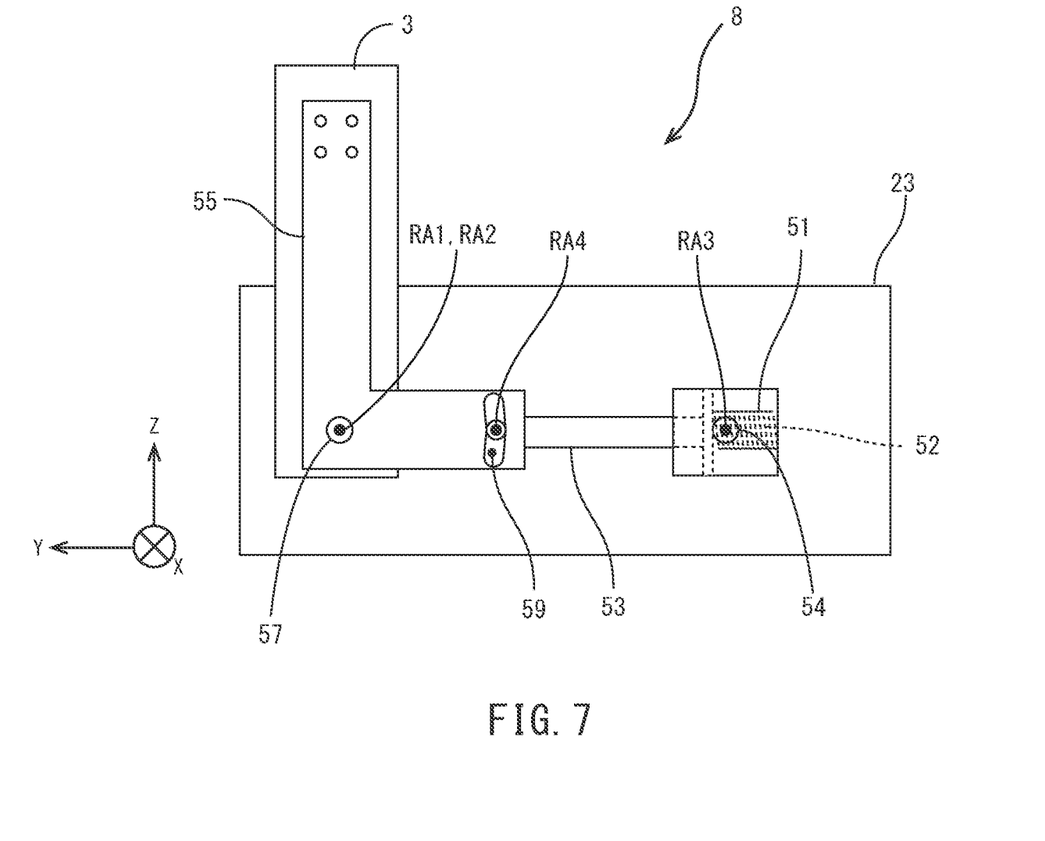
FIG. 7 is a side view showing a reference posture of an arm of a joint mechanism according to a second modification of the embodiment.

As shown in FIG. 7, in a joint mechanism 8 according to the second modification, an arc-shaped slit 59 centered on the rotational axis RA2 is formed at one end of the transmission member 55, and an end of the piston rod 53 is slidably engaged with the slit 59. The arc length of the slit 59 corresponds to the tilt angle of the arm 3 that does not cause the balancer mechanism 5 to function. The joint mechanism 8 according to the second modification allows the balancer mechanism 5 to function when the arm 3 is tilted by a predetermined angle or more from the reference posture, which is a state in which the piston rod 53 is in contact with an end of the slit 59. On the other hand, the balancer mechanism 5 does not function while the piston rod 53 is sliding along the slit 59 of the transmission member 55, until the arm 3 is tilted from the reference posture to the predetermined angle. Since the range of the rotation angle that causes the balancer mechanism 5 to function can be narrowed, the stroke length required for the piston rod 53 can be shortened, and the balancer mechanism 5 can be reduced in size.

While some embodiments have been described, the embodiments have been presented by way of example only, and are not intended to limit the scope of the inventions. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot's joint mechanism comprising:
   a base;
   an arm;
   a first shaft rotatably supporting the arm with respect to the base; and
   a balancer mechanism for generating an auxiliary torque that counteracts a load torque around a rotational center line of the arm applied to the first shaft by a weight of the arm, wherein
   the balancer mechanism includes:
      a balancer body including a casing rotatably supported by the base, a piston rod inserted into the casing, and a traction mechanism for pulling the piston rod; and
      a transmission member for converting a traction force generated by the traction mechanism into the auxiliary torque and transmitting the auxiliary torque to the arm, and
   the transmission member is pivotally supported with respect to the base by a second shaft,
   the second shaft is configured as a separate body spaced apart from the first shaft, the transmission member is engaged with an end of the piston rod at a first position separated by a first distance from a rotational center line of the second shaft, and engaged with the arm at a second position separated by a second distance from a rotational center line of the transmission member, wherein the rotational center line of the transmission member coincides with the rotational center line of the arm.

2. The robot's joint mechanism according to claim 1, wherein the second distance is longer than the first distance.

3. The robot's joint mechanism according to claim 1, wherein the transmission member has an L-shape, a dogleg shape, or an arch shape.

4. The robot's joint mechanism according to claim 1, wherein the transmission member is rotatably connected to the end of the piston rod at the first position and is fixed to the arm at the second position.

5. The robot's joint mechanism according to claim 1, wherein a member brought into contact with the transmission member as the arm is tilted is provided on the arm at a position corresponding to the second position.

6. The robot's joint mechanism according to claim 1, wherein an arc-shaped slit centered on the rotational center line of the transmission member is formed in the transmission member, and the end of the piston rod is slidably engaged with the slit.

7. A robot arm mechanism comprising the robot's joint mechanism according to claim 1.

\* \* \* \* \*